Figure 1:
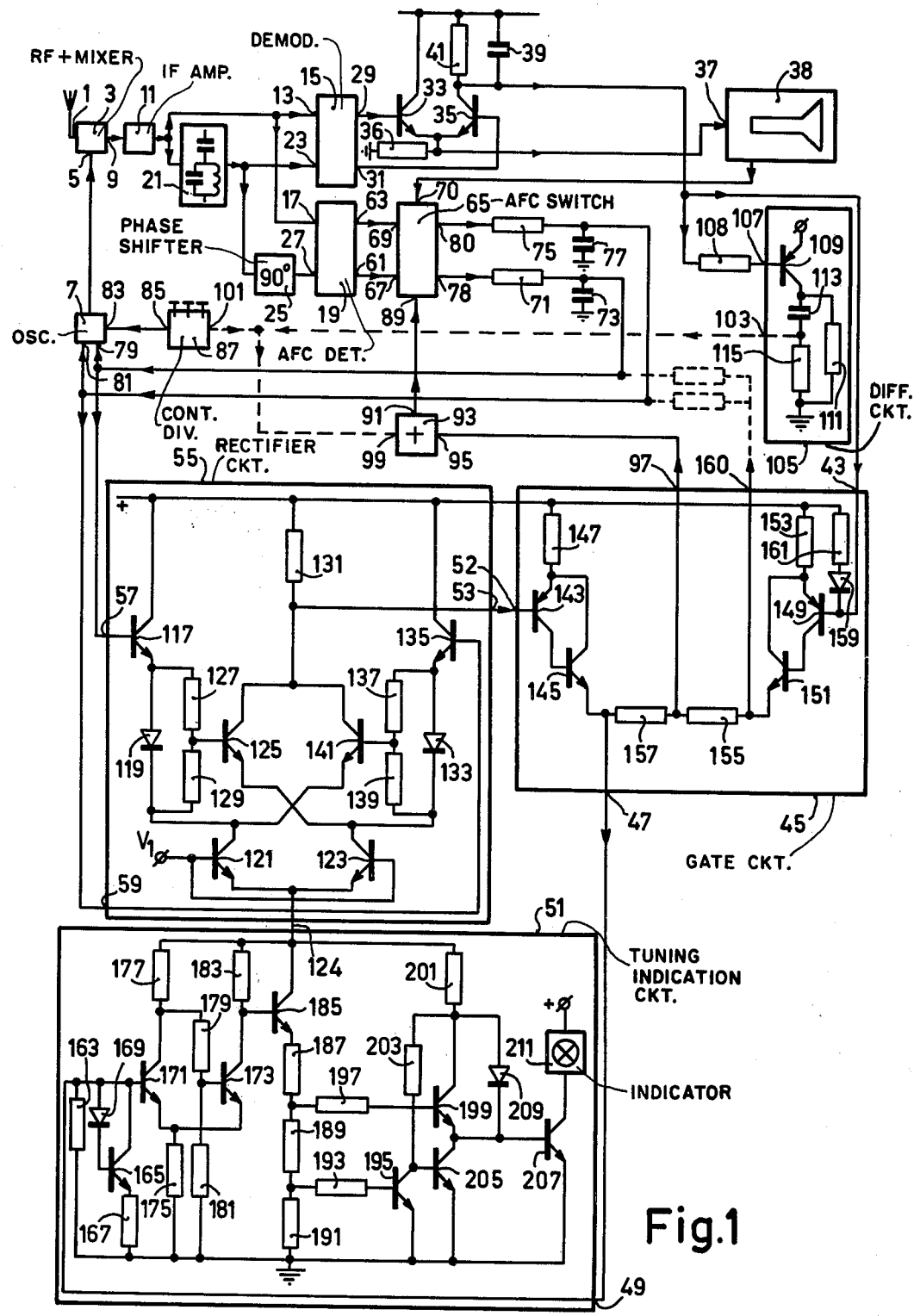

United States Patent [19]

Apeldoorn

[11] 4,159,482
[45] Jun. 26, 1979

[54] TELEVISION RECEIVER HAVING A DEMODULATOR CIRCUIT FOR DEMODULATING A TELEVISION SIGNAL MODULATED ON A CARRIER

[75] Inventor: Hans J. Apeldoorn, Eindhoven, Netherlands

[73] Assignee: U.S. Philips Corporation, New York, N.Y.

[21] Appl. No.: 852,361

[22] Filed: Nov. 17, 1977

[30] Foreign Application Priority Data

Dec. 16, 1976 [NL] Netherlands ......................... 7613946

[51] Int. Cl.² .............................................. H04N 9/50
[52] U.S. Cl. ..................................... 358/23; 358/158; 358/195; 358/192
[58] Field of Search ................... 358/23, 25, 188, 158, 358/192, 195

[56] References Cited

U.S. PATENT DOCUMENTS

| 3,764,925 | 10/1973 | Von Nikelsberg et al. ....... 358/23 X |
| 3,871,022 | 3/1975 | Wilcox ................................... 358/23 |

*Primary Examiner*—Robert L. Richardson
*Attorney, Agent, or Firm*—Thomas A. Briody; William J. Streeter; Henry I. Steckler

[57] ABSTRACT

In a television receiver comprising a synchronous demodulator having a push-pull output behind which an emitter-coupled transistor pair is connected for suppressing whiter-than-white noise signals, a signal can be obtained from the collector circuit of one of the transistors of the transistor pair by means of smoothing which smoothed signal is suitable for many purposes such as, for example, switching-off an automatic frequency control or a tuning indication or a tuning correction.

6 Claims, 2 Drawing Figures

TELEVISION RECEIVER HAVING A DEMODULATOR CIRCUIT FOR DEMODULATING A TELEVISION SIGNAL MODULATED ON A CARRIER

The invention relates to a television receiver having a demodulator circuit for demodulating a television signal modulated on a carrier which demodulator circuit comprises a first input for the signal to be demodulated, a second input for a reference signal which is coupled in frequency and in phase with the signal to be demodulated and a push-pull output circuit which is connected to an input circuit of an emitter-coupled pair of transistors.

The U.S. Pat. No. 3,743,983 discloses a television receiver of the above-mentioned kind wherein the emitter-coupled pair of transistors is used as a rectifying emitter-follower circuit for a television signal demodulated by a demodulator to which also a reference signal is fed. Owing to the rectifying action of the emitter-follower circuit whiter-than-white signals are converted into blacker-than-white signals so that the occurrence of picture elements which light up brilliantly are avoided on display of the television signal.

It is an object of the invention to provide a plurality of new usages of an emitter-coupled pair of transistors in a television receiver of the above-mentioned kind.

A television receiver of the kind according to the invention mentioned in the preamble is therefore characterized in that coupled to the collector circuit of that transistor of the pair of transistors which carries current at a normal reception of the television signal during the occurrence of whiter-than-white signals there is a smoothing circuit an output of which furnishes a signal for operating at least one function of the group of functions formed by tuning indication signal suppression, automatic tuning signal suppression, automatic tuning signal correction, picture signal suppression and sound signal suppression.

The current to the collector of that transistor of the pair of transistors which carries current at a normal reception at the occurrence of whiter-than-white signals appears to depend on the tuning of the receiver, on the amplitude of the television signal received and a possible overdrive or insufficient drive at a channel selection action, that is to say a rapid change in the tuning.

Applicants found that the direct current component of this current furnishes a signal which is particularly suitable for performing a plurality of functions. Circuits for those functions are at present usually constructed in integrated form and, in addition, often incorporated in the same integrated element as the circuit for suppressing whiter-than-white signals so that as a consequence the wiring between various integrated elements can be limited.

The invention will now be further explained with reference to the drawing.

Figure 2:
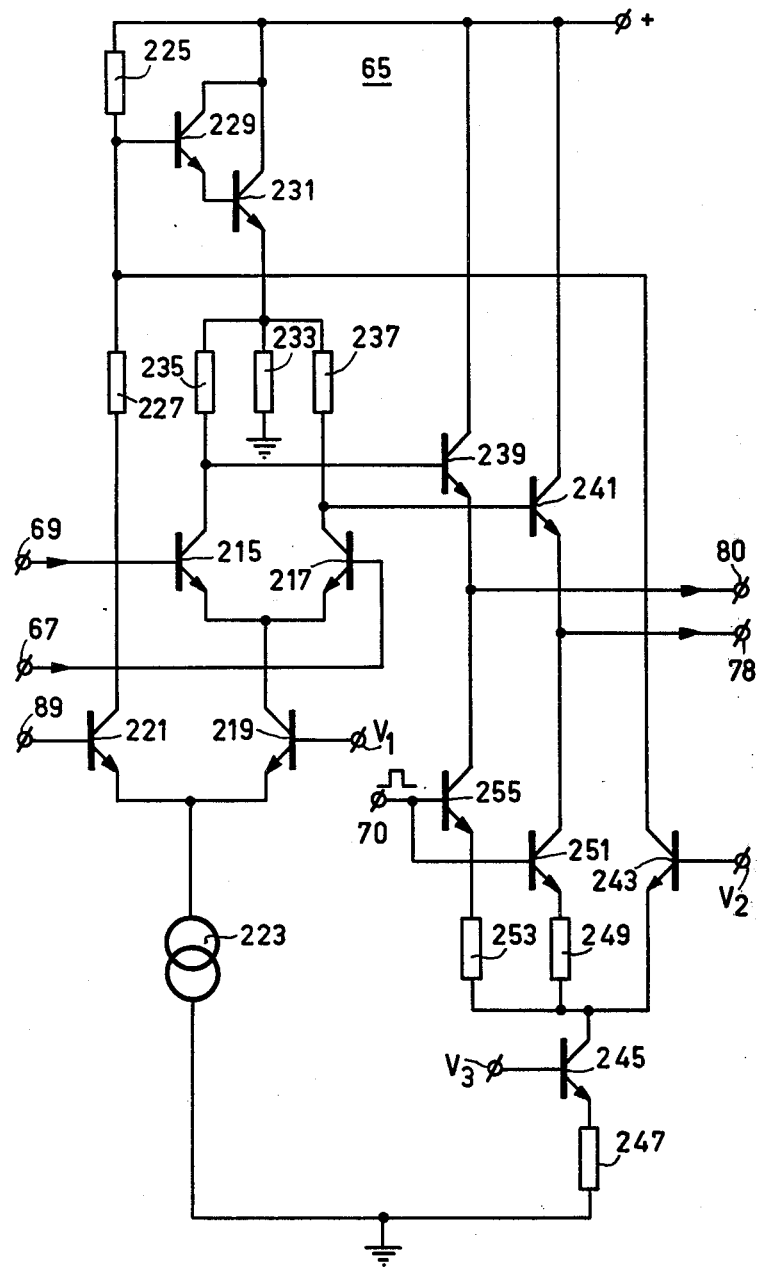

In the drawing:

FIG. 1 illustrates by means of a simplified diagram a television receiver according to the invention, and FIG. 2 shows a circuit diagram of an electronic switch for switching off an automatic tuning correction in a television receiver according to the invention.

In FIG. 1 a receuved television signal is supplied to an input 1 of a high frequency and mixer section 3. A signal derived from an oscillator 7 is supplied to a further input 5 of the high frequency and mixer section 3 so that an intermediate frequency signal is produced at an output 9 thereof. This signal is amplified in an intermediate frequency amplifier 11 and supplied to an input 13 of a demodulator 15 for the television signal and to an input 17 of a tunining deviation detector 19 which will be called AFC detector hereinafter. Through a filter 21 which is tuned to the picture carrier intermediate frequency the intermediate frequency signal is connected to a reference signal input 23 of the demodulator 15 and, in addition, through a 90° phase-shifting network to a further input 27 of the AFC detector 19.

The demodulator 15 has a push-pull output circuit 29, 31 which is connected to the bases of a pair of transistors 33, 35 the emitters of which are interconnected and, through a resistor 36, connected to earth. Across the resistor 36 a demodulated television signal is produced wherein whiter-than-white signals which occur at the output circuit 29, 31 are converted into blacker-than-white signals. The television signals from which the whiter-than-white noise signals are removed in this manner are supplied to an input 37 of a display section 38. This circuit is described in U.S. Pat. No. 3,764,925.

A smoothing circuit with a parallel circuit of a capacitor 39 and a resistor 41 is included in the collector circuit of the transistor 35. The transistor 35 only draws current on receipt of a normal television signal and at a correct tuning of the oscillator 7 if whiter-than-white signals are supplied by the demodulator 15. In that case these signals occur substantially always very briefly and produce a negligible D.C. voltage across the capacitor 39. With such a tuning of the oscillator 7 that the picture intermediate frequency carrier is highly attenuated by the intermediate frequency section 11 relative to the sideband components in the intermediate frequency signal overmodulation of the signal supplied to the input 13 of demodulator 15 occurs. This causes a greater average current through the transistor 35 and the D.C. voltage across the capacitor 39 increases. Except in the case of mistuning as described above the voltage across the capacitor 39 also increases in the case of a pronounced overdrive of the intermediate frequency section such as this occurs if the tuning of the receiver is switched over from the reception of a weak to that of a strong transmitter as long as the circuit present in the receiver for automatic volume control has not yet built up a sufficient control voltage. When switching over the reception from a strong transmitter to that of a weak transmitter this control voltage does not immediately disappear so that the signal briefly disappears from the input 13 of the demodulator 15. The transistors 33 and 35 then draw an equal quantity of current and a D.C. voltage is produced across the capacitor 39. If the field strength of a received transmitter decreases, the voltage across the capacitor 39 increases also.

The voltage across the capacitor 39 is supplied to an input 43 of a gate circuit 45 an output 47 of which is connected to an input 49 of a tuning indication circuit 51. A further input 52 of the gate circuit 45 is connected to an output 53 of a full-wave rectifier circuit 55 to two inputs 57, 59 of which push-pull signals are supplied from two outputs 61, 63 of the tuning deviation detector 19. These signals are supplied to those inputs 57, 59 through a tuning deviation signal suppression circuit 65, called AFC hereinafter, of which two inputs 67, 69 are connected to the outputs 61, 63 of the AFC detector 19, and through two low-pass filters 71, 73 and 75, 77 which are connected to two outputs 78, 80 of the AFC switch 65. The AFC switch 65 has a further input 70 for supplying a pulse signal, a tuning deviation signal derived from the outputs 61, 63 of the tuning deviation detector 19 is not only supplied to the inputs 57 and 59 of the rectifier circuit 55 but also to two frequency control signal inputs 79, 81, called AFC signal inputs hereinafter, of the oscillator 7 for an alternating frequency control or AFC of the receiver. Furthermore the oscillator 7 receives at an input 83 a tuning signal derived from an output 85 of a control device 87. By means of this tuning signal the tuning of the oscillator can be adjusted to the reception of a desired transmitter whereafter the signals at the AFC signal inputs 79, 81 automatically ensure a proper tuning of the oscillator as long as the AFC switch 65 is closed.

The AFC switch 65 can be operated by a control signal supplied to a control signal input 89 thereof. This control signal is derived from an output 91 of a combination circuit 93 which receives at an input 95 a signal from a further output 97 of the gate circuit 45 and at an input 99 a signal derived from an AFC suppression signal output 101 of the control device 87 or derived from an AFC suppression signal output 103 of a differentiating circuit 105 if, for example, the control device 87 has no suitable output or is a remote control device.

The differentiating circuit 105, an input 107 of which is connected through a resistor 108 to the capacitor 39 delivers at its output 103 on changes in a D.C. voltage across the capacitor 39 a signal for switching off the automatic frequency control of the receiver by means of the AFC switch 65. These changes in the voltage across the capacitor 39 and, consequently, at the input 107 occur, as is discussed above, at a change in the tuning from a weak to a strong transmitter or vice versa as a result of a transmitter selection performed with the control device 87.

The differentiating circuit 105 comprises a pnp-transistor 109 which is connected to a positive voltage by means of its emitter and whose base is connected to the input 107 and whose collector is connected to earth through a resistor 111. A series arrangement of a capacitor 113 and a resistor 115 is included in parallel with the resistor 111. The output 103 is connected to the node of the resistor 115 and the capacitor 113. A change in the voltage across the capacitor 39 produces a change in the current through the transistor 109 which produces, across the resistor 115, a voltage which is used in the manner indicated above.

At its inputs 57 and 59 the rectifier circuit 55 receives D.C. voltages which change in the opposite sense as a function of the tuning oscillator 7. In case of a proper tuning of the oscillator 7 these voltages are equal. The input 57 is connected to the base of a first transistor 117 the emitter of which is connected through a diode 119 to the collector of a first current source transistor 121. The emitter of this first current source transistor 121 is connected to the emitter of a second current source transistor 123 and to a terminal 124 of the tuning indication circuit 51. The collector of the second current source transistor 123 is connected to the emitter of a second transistor 125 whose base is connected to a branch of a series arrangement of a first pair of resistors 127, 129 which are in parallel with the diode 119. The collector of the second transistor 125 is connected through a resistor 131 and that of the first transistor 117 directly to a positive voltage. The collector of the second current source transistor 123 is furthermore connected through a diode 133 to the emitter of a third transistor 135 the base of which is connected to the input 59 of the full-wave rectifying circuit 55 and the collector is supplied with a positive voltage. Parallel with the diode 133 there is a series arrangement of a second pair of resistors 137, 139 the node of which is connected to the base of a fourth transistor 141. The emitter of this fourth transistor 141 is connected to the emitter of the first transistor 117 and the collector to the collector of the second transistor 125.

If the voltages at the bases of the first and the third transistor 117 and 135 are equal then the second and the fourth transistor 125 and 141 carry substantially no current and substantially all the current supplied by the current sources 121, 123 passes through the first and third transistor 117, 135 respectively. No voltage is produced across the resistor 131. A small difference in voltage between the bases of the first and the third transistor 117, 135 causes the latter to be substantially non-conducting owing to the voltage drop across the resistor 127 and 137. If the difference in voltage becomes somewhat greater and if the base of the first transistor 117 is positive relative to that of the third transistor 135 then the second transistor 125 starts conducting and a voltage is produced across the resistor 131. At a further increase in the difference in voltage between the bases of the first and the third transistor 117, 135 the third transistor 135 is cut off and the second transistor 125 passes all the current supplied by the second current source transistor 123 to the resistor 131. The voltage across that resistor 131 remains constant at a still further increase in the voltage difference at the inputs 57, 59. In a similar manner the fourth transistor 141 will take over the current from the first transistor 117 if the base voltage of the third transistor 135 becomes higher than that of the first transistor 117.

The voltage across the resistor 131 is taken off at the output 53 and supplied through the input 52 of the gate circuit 45 to the base of a pnp-transistor 143 whose collector is connected to the base of an npn-transistor 145 and the emitter to the collector of the npn-transistor 145. The transistors 143, 145 behave as a pnp-substitute transistor having a large gain factor whose base is that of the transistor 143, the emitter that of the transistor 143 and the collector the emitter of the transistor 145. The emitter of this substitute transistor 143, 147 is connected through a resistor 147 to a positive voltage and the collector thereof is connected to the output 47 of the gate circuit 45. If there is no voltage across that resistor 131 the substitute transistor 143, 145 carries no current, if there is a voltage across that resistor then the substitute transistor 143, 145 deliver a current to the output 47 of the gate circuit 45.

The gate circuit 45 comprises a further pnp-substitute transistor which is constituted by a pair of complementary transistors 149,151 and the base of which is connected to the input 43 of the gate circuit 45, the emitter, through a resistor 153, to the positive voltage and the collector, through a series arrangement of a resistor 155 and a resistor 157, to the output 47 of the gate circuit 45. Furthermore the base of the substitute transistor 149, 151 is connected through a series arrangement of a diode 159 and a resistor 161 to the positive voltage. This series arrangement determines the current gain factor from the input 43 to the output 47. The output 97 is connected to the node of the resistors 155, 157 and an output 160 to the emitter of the transistor 151.

If the voltage at the two inputs 43 and 52 of the gate circuit 45 is high then the output 47 cannot supply current to the input 49 of the tuning indication circuit 51. This case occurs only if no or a very low difference in voltage occurs at the inputs 57, 59 of the rectifier circuit 55 and the voltage across the capacitor 39 is substantially zero and that at a proper tuning of the receiver. Although in case of a mistuning of the receiver relative to this proper tuning substantially no difference in voltage may sometimes be produced between the inputs 57 and 59 of the rectifier circuit 55 owing to the influence of transmitters in adjacent channels so that the voltage across the resistor 131 becomes zero and the substitute transistor 143, 145 does not supply current to the output 47 of the gate circuit 45, a current is supplied in those cases by the substitute transistor 149, 151 to the output 47 of the gate circuit 45 because then a voltage is developped across the capacitor 39 as described above.

If a current is supplied to the input 49 of the tuning indication circuit 51 then the latter produces, across a parallel circuit of a resistor 163 and a series arrangement of a transistor 165 having an emitter resistor 167, the base of this transistor being connected through a diode 169 to its collector and to the input 49, a voltage which is connected to an input of a fed back threshold circuit having a pair of transistors 171, 173. The emitters of these transistors are interconnected and, through a resistor 175 connected to earth. The collector of the transistor 171 is connected through a resistor 177 to the connection 124 to the current source transistors 121, 123 in the full-wave rectifier circuit 55. The connection 124 is kept at a positive voltage owing to the emitter-follower operation of these current source transistors 121, 123, the bases of which are connected to a positive voltage $V_1$. The base of the transistor 173 is connected to a node of a pair of resistors 179, 181 which are connected between the collector of the transistor 171 and earth. The collector of the transistor 173 is connected through a resistor 183 to the connection 124 and in addition to the base of a transistor 185 the collector of which is connected to the connection 125 and the emitter, through a series arrangement of resistors 187, 189, 191, to earth.

If the current to the input 59 is very low the voltage at that input 49 is low owing to the input resistance of the tuning indication circuit 51 and the transistor 171 is non-conducting, whilst the transistor 173 conducts. Consequently, the voltage at the base of the transistor 185 is low and also the voltage drop across the emitter resistors 187, 189, 191 thereof. If the current to the input 49 increases the voltage at the base of the transistor 171 increases and if this voltage is sufficiently high the transistor 171 starts conducting and cuts off the transistor 173. The voltage at the base of the transistor 185 becomes high then and, consequently, the voltage drop across the resistors 187, 189, 191 increases.

The voltage across the resistor 191 is supplied through a resistor 193 to the base of a transistor 195 and that across the resistors 189 and 191 through a resistor 197 to the base of a transistor 199. The collector of the transistor 199 is connected through a resistor 201 to the node 124 and through a resistor 203 to the collector of the transistor 195 and to the base of a transistor 205, whose emitter is earthed, and the collector is connected to the emitter of the transistor 199, to the base of a transistor 207 and to the cathode of a diode 209 the anode of which is connected to the collector of the transistor 199. The emitter of the transistor 207 is earthed and the collector is connected to an indicator 211.

If the voltage at the emitter of the transistor 185 is low the transistor 195 is non-conducting and the transistor 205 conducts through the diode 209 and the resistor 201, the transistor 199 is non-conducting and also the transistor 207, the indicator 211 receives no current.

If the voltage at the emitter of the transistor 185 is high then the transistor 195 conducts and cuts the transistor 205 off. The transistor 199 conducts and the current flowing through the transistor 199 and the diode 209 is fed to the base-emitter junction of the transistor 207 and the indicator 211 receives current.

With a proper tuning of the receiver the indicator 211 receives no current but receives current in the case of incorrect tuning.

The tuning indication circuit 51 can be dimensioned such that the operation of the full-wave rectifier circuit 55 is supported through the node 124 if it is ensured that when the current through the resistor 131 of the rectifier circuit increases an increase in the total current through the node 124 to the tuning indication circuit 51 is effected.

At a correct or nearly correct tuning of the receiver a low voltage is produced at the output 97 of the gate circuit 45 as a result of which the automatic frequency control of the receiver becomes operative through the AFC switch 65. In the case of mis-tuning the voltage at the output 97 becomes high under the influence of the signal at the input 43 of the gate circuit 45 and the automatic frequency control becomes inoperative.

If the output 47 becomes high owing to the fact the input 52 of the gate circuit 45 becomes low the AFC switch 65 does not put the automatic frequency control out of operation because then the voltage at the output 97 does not become high enough.

In this manner an automatic frequency control of the receiver is achieved which does not demand additional control manipulations for switching the automatic frequency control on or off. The indicator 211 can indicate if the tuning is within a desired portion of the hold range of the AFC circuit so that a decrease in amplitude of the field strength of the received transmitter then need not cause unwanted mistuning.

Unwanted mistuning through the automatic frequency control owing to the influence of noise on the AFC detector 19 on receipt of weak signals can be prevented by including a series parallel circuit before the filter 21 as indicated in U.S. Pat. No. 3,968,325 or by taking a correction voltage which depends on the voltage across capacitor 39 off the output 160 of the gate circuit 45 and by supplying this voltage to the AFC signal inputs 79, 81 of the oscillator 7 as shown by the dotted lines in the Figure.

FIG. 2 shows a favourable embodiment of an AFC switch 65 of FIG. 1 in which corresponding sections have been given the same reference numerals as those in FIG. 1.

To the inputs 67, 69 of the AFC switch 65 signals are supplied which are derived from the AFC detector 19. They are demodulated components of the television signal wherein the synchronisation signal and the black level are present with an amplitude which depends on the phase shift caused by the filter 21 which is zero degrees with a correct tuning of the receiver so that then owing to the 90° phase shift no synchronisation and back porch signals occur in the network 25. At a mistuning filter 21 causes a signal having a phase shift differing from zero degrees and the amplitude of the demodulated television signals at the inputs 67 and 69 increases, those signals being of the opposite polarity and the sign of this polarity reversing at a passage through the correct tuning.

The signals at the inputs 67, 69 are supplied to the bases of an emitter-coupled transistor pair 215, 217 whose emitters are connected to the collector of a transistor 219 whose base is connected to the reference voltage $V_1$ and the emitter to the emitter of a transistor 221 and to a current source 223. The base of the transistor 221 is connected to the control signal input 89.

If the voltage at the control signal input 89 is high relative to $V_1$ then the transistor 221 carries all the current produced by the current source 223. This current flows through a resistor 225 and a resistor 227 from the positive supply voltage to the collector of the transistor 221. The node of the resistors 225, 227 is connected to the base of a transistor 229 whose emitter is connected to the base of a transistor 231. The collectors of these transistors 229, 231 are connected to the positive supply voltage. The emitter of the transistor 231 is connected through a resistor 233 to earth, through a resistor 235 to the collector of the transistor 215 and through a resistor 237 to the collector of the transistor 217. The values of the resistors 235 and 237 are twice as great as those of the resistor 225. If the resistance value of said last resistor is R then that of the resistors 235, 237 is equal to 2R.

In the switched-off condition described above the AFC switch 65 wherein all the current produced by the current source 233 passes with a value I through the resistor 225 having the value R the voltage drop across the resistor 225 is equal to IR. The transistors 215 and 217 are non-conducting because the transistor 219 is non conducting and no signal is passed on through the transistors 215, 217. The collectors of the transistors 215, 217 both have a voltage which is $IR+2V_{be}$ lower than the positive supply voltage. This voltage is passed on to the bases of a pair of transistors 239, 241 which are connected as emitter followers to the outputs 81, 79.

If now the voltage at the control signal input 89 is made low then the switch-on state occurs and the transistor 219 carries all the current produced by the current source 223. Then the transistor 221 is non-conducting and the voltage at the base of the transistor 229 becomes substantially equal to the positive supply voltage and that at the emitter of the transistor 231 $2V_{be}$ lower. If the inputs 67 and 69 show no voltage difference which is the case with a correct tuning of the receiver, each of the transistors 215 and 217 carry half the current produced by the current source 223 and the voltage drop across each of the resistors 235, 237 is equal to $\frac{1}{2} \cdot I \cdot 2R = IR$ so that also in this case a voltage is connected to the bases of the transistors 239, 241 which is $IR+2V_{be}$ lower than the positive supply voltage.

In the switched-off state of the AFC switch 65 the same voltage is consequently produced at the bases of the emitter followers 239, 241 as in the switched-on state at a proper tuning.

In the above the influence of a transistor 243 which is connected to the node of the resistors 225, 227 by means of its collector is left out of consideration because this transistor is non-conducting at the instants which are important for the generation of an AFC voltage. The base of this transistor 243 is connected to a fixed voltage $V_2$ and the emitter to the collector of a current source transistor 245 having an emitter resistor 247 and a base which is connected to a fixed voltage $V_3$. In addition, the emitter of the transistor 243 is connected through a resistor 249 to the emitter of a transistor 251 and through a resistor 253 to the emitter of a transistor 255. The collector of the transistor 251 is connected to the emitter of the transistor 241 and the collector of the transistor 255 to the emitter of the transistor 239. The bases of the transistors 251, 255 are through-connected and connected to the pulse signal input 70. During the occurrence of the synchronization signals or the back porches the input 70 receives a positive pulse which causes the transistors 251 and 255 to conduct whilst the transistor 243 is in the non-conducting state described above. Then the outputs 79, 81 supply signals which correspond with the synchronization signal or back porch amplitudes. If the voltage at the pulse signal input 70 is low then the transistor 243 conducts and produces such a voltage drop across the resistor 225 that through the transistors 229, 231 and the resistors 235, 237 the base voltages of the transistor 239, 241 become low relative to the voltage which was present during the occurrence of the pulses at the outputs 79 and 81. Owing to the storage action of a time constant network at the outputs 79 and 81 the transistor 239, 241 is cut-off. Then the transistors 251 and 255 are also non-conducting so that no charge exchange can take place with the circuit at the outputs 79, 81.

Although in the above the smoothing capacitor 39 was connected to the collector of the transistor 35 it will be clear that, if so desired, for example an amplifier can be included between the collector circuit of the transistor 35 and the smoothing capacitor 39.

It is sometimes customary to suppress, for example together with the automatic volume control, also the picture or sound reproduction. It will be clear than one or more of the signals described above obtained from the smoothing capacitor 39 can be used for that purpose.

What is claimed is:

1. A television receiver comprising a demodulator circuit means for demodulating a television signal modulated on a carrier, said demodulator circuit means having a first input means for receiving the signal to be demodulated, a second input means for receiving a reference signal which is synchronized in frequency and phase with the signal to be demodulated, and a push-pull output circuit; an emitter-coupled transistor pair having an input circuit coupled to said output circuit, one of the transistors of the transistor pair conducting current during normal reception of the television signal during the occurrence of whiter-than-white signals; and a smoothing circuit coupled to the collector of said one transistor and having an output means for providing a signal for controlling at least one function of a group of functions.

2. A television receiver as claimed in claim 1, wherein the function which is controlled by the signal obtained from the smoothing circuit is a tuning indication signal suppression, and further comprising a tuning deviation detection circuit having a push-pull output circuit means for supplying a tuning indication signal, a full-wave rectifier circuit coupled to said output circuit means, a gate circuit coupled to said full wave rectifier circuit and to said smoothing circuit, and a tuning indication circuit coupled to said rectifier and gate circuits.

3. A television receiver as claimed in claim 2, wherein said rectifier circuit comprises a current source circuit means for supplying a feedback signal to said tuning indication circuit.

4. A television receiver as claimed in claim 2, wherein the full-wave rectifying circuit comprises a first transistor pair having a first and a second transistor, and a second transistor pair having a third and a fourth transistor, the emitter of the first transistor being coupled through a parallel circuit of a first resistor and a first diode to the emitter of the fourth transistor and to a first current source, the base of the second transistor being coupled to a tap on the first resistor, the emitter of the third transistor being coupled through a parallel arrangement of a second resistor and a second diode to the emitter of the second transistor and to a second current source, the base of the fourth transistor being coupled to a tap on the second resistor, and the collectors of the second and the fourth transistors being coupled through a common load resistor to a supply terminal, whereby said load resistor can provide a tuning indication signal.

5. A television receiver as claimed in claim 1, further comprising a differentiating circuit coupled to said smoothing circuit and having an output, and a tuning deviation signal suppression circuit having an input coupled to said differentiating circuit output.

6. A television receiver as claimed in claim 1, wherein the function which is controlled by the signal obtained from the smoothing circuit is an automatic tuning signal suppression, and further comprising an AFC switch having a control signal input coupled to the smoothing circuit, said AFC switch comprising a first transistor having a base coupled to said control signal input, said first transistor being emitter-coupled with a second transistor, said second transistor having a collector coupled to the emitters of a pair of transistors, automatic tuning signals to be switched being supplied to the bases of said pair, and the collectors of said pair each being coupled with a resistor to the emitter of an emitter follower, the base of said emitter follower being coupled through a resistor having a value which is equal to half that of the first mentioned resistor to a supply terminal and furthermore being coupled to the collector of the first transistor in such a way that the collector current of the first transistor on switch-off of the switch flows through said last-mentioned resistor.

* * * * *